United States Patent
Nakamizo et al.

[11] Patent Number: 6,148,671
[45] Date of Patent: Nov. 21, 2000

[54] ACCELERATION SENSOR AND TRIAXIAL ACCELERATION SENSOR

[75] Inventors: Yoshiyuki Nakamizo; Hideki Kobayashi; Megumi Hashizaki, all of Toyama Pref., Japan

[73] Assignee: Hokuriku Electric Industry Co., Ltd., Toyama Pref., Japan

[21] Appl. No.: 09/161,805

[22] Filed: Sep. 28, 1998

[30] Foreign Application Priority Data

Sep. 26, 1997 [JP] Japan ................................. 9-261782
Oct. 8, 1997 [JP] Japan ................................. 9-275829
Sep. 21, 1998 [JP] Japan ................................. 10-266323

[51] Int. Cl.$^7$ .............................. G01P 15/09; G01L 1/00; G01L 3/00
[52] U.S. Cl. ................................ 73/514.34; 73/862.041; 73/862.043
[58] Field of Search ........................... 73/514.34, 514.32, 73/862.043, 862.041, 862.68, 862.637, DIG. 4, 721, 727, 862.628, 862.632, 862.642; 310/329

[56] References Cited

U.S. PATENT DOCUMENTS

| | | |
|---|---|---|
| 5,006,487 | 4/1991 | Stokes ..................................... 437/228 |
| 5,128,581 | 7/1992 | Nakayama et al. .................. 73/514.34 |
| 5,365,799 | 11/1994 | Okada . |
| 5,417,115 | 5/1995 | Burns ........................................ 73/778 |
| 5,571,972 | 11/1996 | Okada . |
| 5,616,844 | 4/1997 | Suzuki et al. ........................ 73/514.32 |
| 5,646,346 | 7/1997 | Okada ................................. 73/504.04 |
| 5,763,783 | 6/1998 | Asada .................................. 73/514.31 |

*Primary Examiner*—Hezron Williams
*Assistant Examiner*—Helen C. Kwok
*Attorney, Agent, or Firm*—Rankin, Hill, Porter & Clark LLP

[57] ABSTRACT

An acceleration sensor capable of restraining a reduction in output thereof due to an electrostatic capacity between acceleration detecting electrodes and output electrodes. A low-dielectric layer is arranged between a connection line and a piezoelectric ceramic substrate. Another low-dielectric layer is arranged between additional connection lines and output electrodes, and the substrate. The low-dielectric layers are formed of a material substantially reduced in relative dielectric constant as compared with the substrate. The low-dielectric layers reduce an electrostatic capacity generated between wiring patterns and the output electrodes, and a counter electrode pattern, to thereby reduce the amount of spontaneous polarization charges accumulated in the electrostatic capacity.

20 Claims, 4 Drawing Sheets

ACCELERATION SENSOR AND TRIAXIAL ACCELERATION SENSOR

BACKGROUND OF THE INVENTION

This invention relates to an acceleration sensor, and more particularly an acceleration sensor and a triaxial acceleration sensor each utilizing piezoelectric ceramics to detect acceleration.

A conventional triaxial acceleration sensor constructed so as to detect acceleration in each of X-axis, Y-axis and Z-axis directions perpendicular to each other by means of a piezoelectric ceramic substrate and a weight is basically constructed and manufactured in such a manner as taught in International Publication WO 93/02342 (PCT/JP92/00882, U.S. Pat. No. 5,365,799), U.S. Pat. No. 5,571,972 and the like.

Also, another acceleration sensor is known in the art which includes a piezoelectric ceramic substrate having acceleration detecting electrodes, output electrodes and wiring patterns for connecting the acceleration detecting electrodes and output electrodes to each other formed on a front surface thereof and a counter electrode pattern opposite to at least the acceleration detecting electrodes formed on a rear surface thereof, a diaphragm joined to the rear surface of the piezoelectric ceramic substrate, and a weight joined to a rear surface of the diaphragm for generating stress in a region of the piezoelectric ceramic substrate on which the acceleration detecting electrodes are arranged depending on acceleration.

Unfortunately, the piezoelectric ceramic substrate is relatively increased in relative dielectric constant, so that the conventional acceleration sensor of course causes an electrostatic capacity to be generated between the wiring patterns and output electrodes and the counter electrode pattern. Spontaneous polarization charges generated between the acceleration detecting electrodes and the counter electrode pattern are accumulated in the thus-generated electrostatic capacity as well. Thus, the conventional acceleration sensor encounters a problem that an acceleration signal in the form of a voltage signal or a current signal outwardly taken out of the output electrodes is reduced in output to a degree. Thus, in the prior art, amplification of the acceleration signal to a desired level is carried out using an amplifier. However, this causes detection accuracy to be deteriorated due to amplification characteristics of the amplifier with an increase in degree of amplification.

Further, the conventional triaxial acceleration sensor, when one of X-axis direction acceleration, Y-axis direction acceleration and Z-axis direction acceleration in the same magnitude is solely applied to the weight, generally causes levels of an X-axis direction acceleration signal generated from an X-axis direction acceleration output electrode X, a Y-axis direction acceleration signal generated from a Y-axis direction acceleration output electrode Y and a Z-axis direction acceleration signal generated from a Z-axis direction acceleration output electrode Z to be incoincident with each other. An increase in difference between the levels leads to a deterioration in detection accuracy. In view of the problem, the prior art is so constructed that an amplification level of the acceleration signal is adjusted by means of an amplifier, to thereby carry out correction for coinciding the levels in the respective directions with each other. Unfortunately, adjustment of the amplification level is highly troublesome, leading to a deterioration in productivity.

SUMMARY OF THE INVENTION

The present invention has been made in view of the foregoing disadvantages of the prior art.

Accordingly, it is an object of the present invention to provide an acceleration sensor which is capable of substantially restraining a reduction in output due to an electrostatic capacity between acceleration detecting electrodes and output electrodes.

It is another object of the present invention to provide an acceleration sensor which is capable of eliminating a necessity of substantially increasing an amplification degree of an amplifier for amplifying an output of output electrodes.

It is a further object of the present invention to provide an acceleration sensor which is capable of reducing an electrostatic capacity formed between at least wiring patterns and a counter electrode pattern.

It is still another object of the present invention to provide a triaxial acceleration sensor which is capable of substantially restraining a reduction in output due to an electrostatic capacity between acceleration detecting electrodes and output electrodes.

It is yet another object of the present invention to provide a triaxial acceleration sensor which is capable of eliminating a necessity of adjusting a signal level using an amplifier or simplifying adjustment operation.

It is even another object of the present invention to provide a triaxial acceleration sensor which is capable of approaching signal levels of acceleration signals to each other to the utmost.

It is a still further object of the present invention to provide a triaxial acceleration sensor which is capable of reducing an electrostatic capacity formed between at least wiring patterns and a counter electrode pattern.

It is a yet further object of the present invention to provide a triaxial acceleration sensor which is capable of reducing a variation in peak value of spontaneous polarization charges due to an error of a fixed position of a weight.

As a result of inventors' study on reasons for which the conventional triaxial acceleration sensor causes incoincidence between the signal levels in the respective directions, it was found that the piezoelectric ceramic substrate is increased in relative dielectric constant, to thereby cause an electrostatic capacity to be generated between the output electrodes and wiring patterns and the counter electrode pattern, leading to a reduction in output and incoincidence of the signal levels. The spontaneous polarization charges produced on the acceleration detecting electrode are accumulated in the electrostatic capacity between the acceleration detecting electrode and the output electrode as well. An increase in the amount of charges accumulated causes a reduction in acceleration signal outputted from the output electrode. Also, in the triaxial acceleration sensor, the output electrode and wiring pattern are different in configuration and area from each other, therefore, there occurs a difference among an electrostatic capacity generated between the X-axis acceleration output electrode and wiring pattern connected thereto and the counter electrode pattern, that between the Y-axis acceleration output electrode and wiring pattern connected thereto and the counter electrode pattern, and that between the Z-axis acceleration output electrode and wiring pattern connected thereto and the counter electrode pattern. The electrostatic capacity, as described above, has spontaneous polarization charges which are generated in the corresponding acceleration detecting electrode accumulated therein, so that the X-axis direction acceleration signal, the Y-axis direction acceleration signal and the Z-axis direction acceleration signal are different in level from each other.

In accordance with the present invention, an acceleration sensor generally includes a piezoelectric ceramic substrate;

a surface electrode pattern formed on a front surface of the piezoelectric ceramic substrate and including acceleration detecting electrodes for generating a signal depending on acceleration, output electrodes for externally outputting an output of the acceleration detecting electrodes and wiring patterns for electrically connecting the acceleration detecting electrodes and output electrodes to each other therethrough; a counter electrode pattern formed on a rear surface of the piezoelectric ceramic substrate and arranged opposite to at least the acceleration detecting electrodes; and a weight arranged in a manner to be fixed with respect to the piezoelectric ceramic substrate to generate stress depending on the acceleration in a region in which the acceleration detecting electrodes are arranged.

In the acceleration sensor of the present invention thus generally constructed, layers reduced in dielectric constant (hereinafter referred to as "low-dielectric layers") are arranged between all of the wiring patterns or an essential part thereof and the piezoelectric ceramic substrate. The low-dielectric layers are sufficiently reduced in relative dielectric constant as compared with that of the piezoelectric ceramic substrate.

Such formation of the low-dielectric layers permits the piezoelectric ceramic substrate increased in relative dielectric constant and the low-dielectric layers to be connected directly to each other, resulting in an electrostatic capacity $C1$ generated by only the piezoelectric ceramic substrate and an electrostatic capacity $C2$ generated by the low-dielectric layers to be connected in series to each other. Simply considering, an electrostatic capacity $C$ obtained when the low-dielectric layers are arranged is $C1 \cdot C2/(C1+C2)$ [$C=C1 \cdot C2/(C1+C2)$]. Supposing that $C2$ is substantially small as compared with $C1$, $C$ is substantially smaller than $C1$. For example, when $C2$ is $1/10$ as large as $C1$ or less, the electrostatic capacity $C$ is reduced to a level 0.9 times as high as $C1$. Thus, in the present invention, an electrostatic capacity between all of the wiring patterns or an essential part thereof and the piezoelectric ceramic substrate is substantially reduced, to thereby restrain a reduction in output or reduce the amount of spontaneous polarization charges accumulated in the electrostatic capacity.

In order to minimize the electrostatic capacity, the low-dielectric layers should be arranged between all of the wiring electrode patterns and output electrodes and the piezoelectric ceramic substrate. However, as a result of actual arrangement of the low-dielectric layer, it was found that the electrostatic capacity can-be reduced to a practically acceptable level even when no low-dielectric layer is arranged therebetween. More specifically, the low-dielectric layers may be arranged between a portion of the wiring patterns positioned outside a region thereof in which the acceleration detecting electrodes are arranged and the piezoelectric ceramic substrate. Such arrangement permits the electrostatic capacity to be reduced to a practically acceptable level. A reduction in region on which the low-dielectric layers are arranged not only facilitates printing of the low-dielectric layers correspondingly but decreases the amount of a material therefor.

The counter electrode pattern may be formed on the rear surface of the piezoelectric ceramic substrate in a manner to be opposite to at least the acceleration detecting electrodes. The counter electrode pattern may be formed opposite to only the acceleration detecting electrodes or the whole surface electrode pattern. When the counter electrode pattern is formed opposite to only the acceleration detecting electrodes, the counter electrode pattern is arranged obliquely opposite to the wiring patterns and output electrodes, resulting in the electrostatic capacity being reduced. However, it is not rendered zero. Arrangement of the low-dielectric layers significantly reduces an electrostatic capacity between the wiring patterns and output voltages and the counter electrode pattern which are arranged obliquely opposite to each other.

When the counter electrode pattern is formed in a manner to be opposite to the whole surface electrode pattern, the counter electrode pattern is caused to be directly opposite to the wiring patterns and output electrodes, resulting in an electrostatic capacity being generated in a relatively large amount. Use of the low-dielectric layers in such a case permits the electrostatic capacity to be substantially reduced. Also, in this instance, arrangement of the low-dielectric layers on the whole piezoelectric ceramic substrate other than the acceleration detecting electrodes promotes a reduction in electrostatic capacity.

The piezoelectric ceramic substrate may have a diaphragm joined to the rear surface thereof. In this instance, the weight may be arranged on a central portion of the diaphragm. Instead, the weight may be arranged directly on a central portion of the rear surface of the piezoelectric ceramic substrate without using any diaphragm. This permits the piezoelectric ceramic substrate to be deflected directly due to displacement of the weight. This results in stress due to a variation in the weight caused by acceleration applied to the weight directly occurring in the piezoelectric ceramic substrate, leading to an increase in accuracy and/or sensitivity of measurement of the acceleration sensor. Also, this reduces the number of parts because any diaphragm is not provided.

The low-dielectric layers each may have a relative dielectric constant and a thickness set so that an acceleration signal outputted from each of the output electrodes is reduced to a substantially negligible level due to an electrostatic capacity formed between the wiring patterns and output electrodes and the counter electrode pattern.

Actually, the low-dielectric layers each may have a relative dielectric constant set to a level one hundredth as low as that of the piezoelectric ceramic substrate or less and are formed into a thickness 0.2 times as large as that of the piezoelectric ceramic substrate or more. When the thickness is below a level 0.2 times as large as that of the piezoelectric ceramic substrate, it is not possible to effectively reduce the electrostatic capacity.

The low-dielectric layers each may be formed of a material mainly consisting of glass or thermosetting resin. In this instance, the low-dielectric layers each may be made of a material mainly consisting of thermosetting resin and the wiring patterns and acceleration output electrodes each may be made of a conductive paste formed by incorporating a conductive powder in thermosetting resin.

Also, in accordance with the present invention, a triaxial acceleration sensor is provided. The triaxial acceleration sensor includes a piezoelectric ceramic substrate; a surface electrode pattern formed on a front surface of the piezoelectric ceramic substrate and including one or more X-axis direction acceleration detecting electrodes for detecting acceleration in an X-axis direction, one or more Y-axis direction acceleration detecting electrodes for detecting acceleration in a Y-axis direction, one or more Z-axis direction acceleration detecting electrodes for detecting acceleration in a Z-axis direction, one or more X-axis direction acceleration output electrodes, one or more Y-axis direction acceleration output electrodes, one or more Z-axis direction acceleration output electrodes, a first wiring pattern for connecting the X-axis direction acceleration detecting electrodes and X-axis direction acceleration output electrodes to each other, a second wiring pattern for connecting the Y-axis direction acceleration detecting electrodes and Y-axis direction acceleration output electrodes to each other, and a third wiring pattern for connecting the Z-axis direction acceleration detecting electrodes and Z-axis direction acceleration output electrodes to each other; a counter electrode pattern formed on a rear surface of the piezoelectric ceramic substrate and arranged opposite to at least the X-axis direction acceleration detecting electrodes, Y-axis direction acceleration detecting electrodes and Z-axis direction acceleration detecting electrodes; a weight of a cylindrical or hollow-cylindrical shape arranged in a manner to be fixed with respect to the piezoelectric ceramic substrate to generate stress depending on the acceleration in a region in which the X-axis direction acceleration detecting electrodes, Y-axis direction acceleration detecting electrodes and Z-axis direction acceleration detecting electrodes each are arranged; and low-dielectric layers arranged between all of at least the first to third wiring patterns or an essential part thereof and the piezoelectric ceramic substrate. The low-dielectric layers are sufficiently reduced in relative dielectric constant as compared with that of the piezoelectric ceramic substrate. The piezoelectric ceramic substrate is polarized at a portion thereof between each of the X-axis direction acceleration detecting electrodes, Y-axis direction acceleration detecting electrodes and Z-axis direction acceleration detecting electrodes and the counter electrode.

A reduction in electrostatic capacity between all of the first to third wiring patterns or an essential part thereof and the counter electrode pattern which is attained by the present invention substantially restrains lowering of a level of an acceleration signal appearing on each of the acceleration output electrodes due to the electrostatic capacity. This permits the triaxial acceleration sensor to be designed substantially without: considering dimensions of the electrodes, a configuration of the wiring patterns and a length thereof. Also, this minimizes an increase in deviation of a level of each of signals outputted from the output electrodes, to thereby substantially eliminate a necessity of correcting the signal level. Also, any possible deviation of the signal level is slight, so that the signal level may be readily adjusted. Further, an increase in accuracy of assembling of the triaxial acceleration sensor fully eliminates a necessity of correcting the acceleration signal, to thereby further facilitate manufacturing thereof.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference characters designate like or corresponding parts throughout; wherein.

DETAILED DESCRIPTION OF THE PREFERRED EMBODIMENTS

Now, an acceleration sensor according to the present invention will be described hereinafter with reference to the accompanying drawings.

Figure 1:
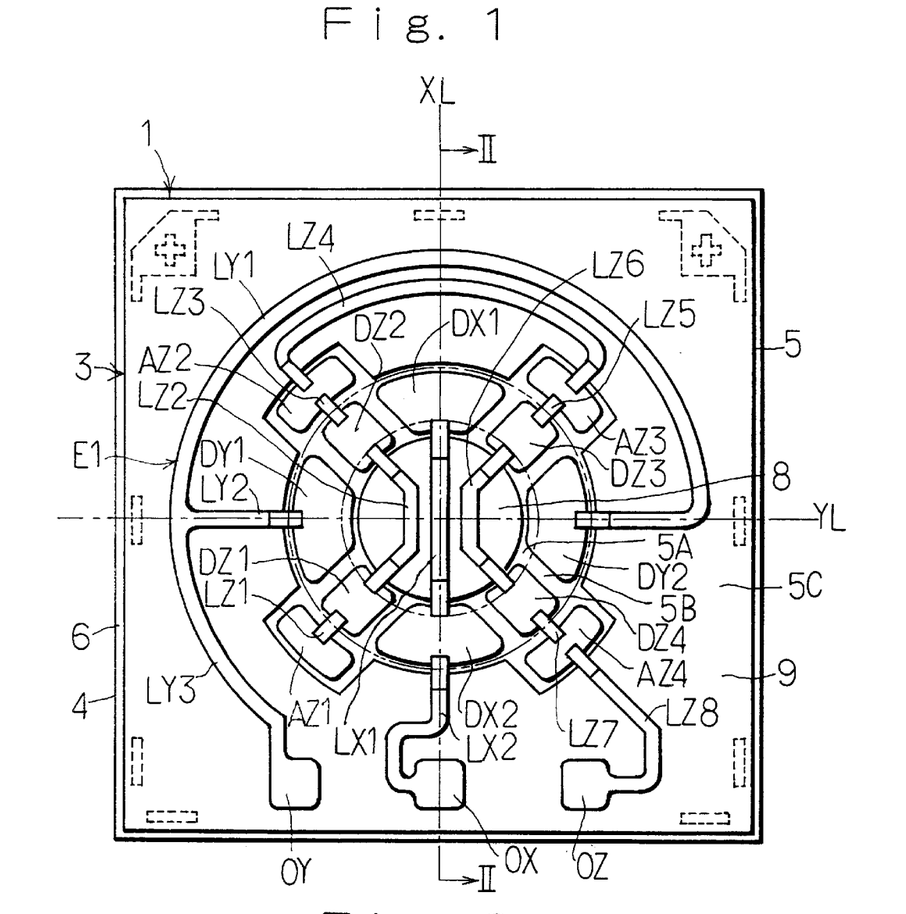
FIG. 1 is a plan view showing an embodiment of an acceleration sensor according to the present invention which is embodied in the form of a triaxial acceleration sensor.
Figure 2:
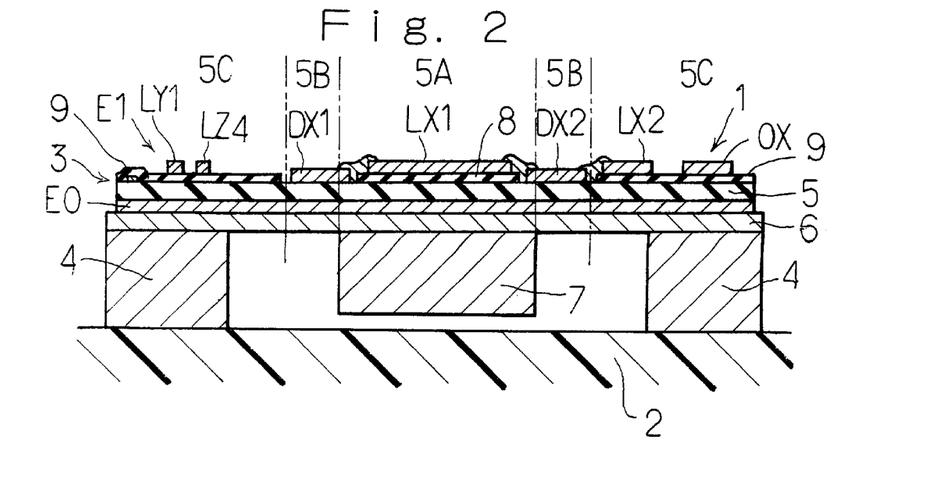
FIG. 2 is a sectional view taken along line II—II of FIG. 1.

Referring first to FIGS. 1 and 2, an embodiment of an acceleration sensor according to the present invention is illustrated, which is embodied in the form of a triaxial acceleration sensor. A triaxial acceleration sensor of the illustrated embodiment which is generally designated by reference numeral 1 generally includes a sensor body 3 and a support 4 formed of metal into a cylindrical shape for supporting the sensor body 3 through an outer periphery thereof. The support 4 is joined to a mount base 2 by means of an adhesive, so that the triaxial acceleration sensor 1 is mounted on the mount base 2. The mount base 2 is made of metal. The sensor body 3 includes a piezoelectric ceramic substrate 5, a diaphragm 6 made of metal and joined to the piezoelectric ceramic substrate 5, and a weight 7 joined to the diaphragm 6. The piezoelectric ceramic substrate 5 is so polarized that application of internal stress thereto permits generation of spontaneous polarization charges. The piezoelectric ceramic substrate 5 is formed into an overall configuration of a square. The piezoelectric ceramic substrate 5 is formed on one surface thereof or a front surface thereof with a surface electrode pattern E1 and on the other surface thereof or a rear surface thereof with a counter electrode pattern E0. The above-described metal diaphragm 6 is joined to the rear surface of the piezoelectric ceramic substrate 5 by means of an adhesive.

The piezoelectric ceramic substrate 5 includes a weight fixing region 5A, an intermediate region 5B and an outer peripheral region 5C. The weight fixing region 5A is defined at a central portion of the piezoelectric ceramic substrate 5 and formed into a circular shape. The weight fixing region 5A is fixedly mounted thereon with the weight 7 through the counter electrode pattern E0 and diaphragm 6. The weight 7 is made of aluminum alloy, copper alloy, iron alloy or the like and formed into a solid cylindrical shape. The weight 7 is fixed on the diaphragm 6 so that a central axis thereof extends through a center of the weight fixing region 5a and then perpendicularly intersects the surface of the piezoelectric ceramic substrate 5.

The intermediate region 5B is formed into an annular shape so as to surround the weight fixing region 5A. The intermediate region 5B is constructed so as to be deformed into states point-symmetrically different from each other or a state in which tensile strength is applied thereto and a state in which compressive stress is applied thereto, when acceleration acts on the weight 7 in a direction parallel to the piezoelectric ceramic substrate 1 or an X-axis or Y-axis direction. Also, when acceleration is applied to the weight 7 in a direction perpendicular to the piezoelectric ceramic substrate 5 or a Z-axis direction, the intermediate region 5B is deformed into the same state or a state in which tensile strength is applied thereto.

The surface electrode pattern E1 and counter electrode pattern E0 respectively formed on the front and rear surfaces of the piezoelectric ceramic substrate 5 are formed of a silver paste prepared by incorporating a silver power acting as a conductive powder into thermosetting resin by screen printing. A variation in spontaneous polarization charges occurring between the surface electrode pattern E1 and the counter electrode pattern E0 permits acceleration in each of three-axis (X-axis, Y-axis and Z-axis) directions applied to the weight 7 to be measured. The X, Y and Z axes referred to herein are defined so as to extend in directions perpendicular to each other. In the illustrated embodiment, the X and Y axes are defined so as to extend in a surface direction of the piezoelectric ceramic substrate 5 and the Z axis is defined so as to extend in a direction perpendicular to the surface direction of the piezoelectric ceramic substrate 5. Also, in the illustrated embodiment, the counter electrode pattern E0 is arranged in a manner to positionally correspond to the whole surface electrode pattern E1 and formed into a thickness of 10 $\mu$m. The piezoelectric ceramic substrate 5 is joinedly mounted on the rear surface thereof with the metallic diaphragm 6 through the counter electrode pattern E0 by means of an adhesive, as described above. The counter electrode pattern E0 is formed on the rear surface thereof with ruggedness (not shown), so that the adhesive may enter recesses of such ruggedness on the rear surface of the counter electrode pattern E0 to carry out joining between the counter electrode pattern E0 and the diaphragm 6 while keeping projections of the ruggedness abutted against the metallic diaphragm 6. This results in the counter electrode pattern E0 being grounded through the metallic diaphragm 6 and support 4 to the mount base 2. Alternatively, a pattern for ground may be separately arranged, to thereby be joined to the metallic diaphragm 6 through a conductive adhesive, resulting in the grounding being further ensured. The surface electrode pattern E1 includes an electrode pattern section formed in each of the three-axis (X-axis, Y-axis and Z-axis) directions and formed into a thickness of 10 $\mu$m like the counter electrode pattern E0. The electrode pattern section in the X-axis direction of the surface electrode pattern E1 is so constructed that two X-axis direction acceleration detecting electrodes DX1 and DX2 and an X-axis direction output electrode OX are connected in series to each other by connection lines LX1 and LX2. In the illustrated embodiment, two such connection lines or pattern sections LX1 and LX2 cooperate with each other to constitute a first wiring pattern. The pattern section LX1 is provided at an end thereof connected to each of the acceleration detecting electrodes DX1 and DX2 with a connection, which is made of a silver paste. The pattern section LX2 is provided at an end thereof connected to the acceleration detecting electrode DX2 with a connection.

The X-axis direction acceleration detecting electrodes DX1 and DX2 each are formed into an arcuate configuration so as to be substantially positioned on the intermediate region 5B and partially extend between the weight fixing region 5A and the intermediate region 5B. Also, the acceleration detecting electrodes DX1 and DX2 are symmetrically arranged in a manner to be positioned on a virtual X-axis straight line XL extending on the piezoelectric ceramic substrate 5 and interpose the weight fixing region 5A therebetween. The connection line LX1 extends on the weight fixing region 5A so as to connect the acceleration detecting electrodes DX1 and DX2 to each other by the shortest distance. The output electrode OX is formed into a substantially square shape and arranged on the outer peripheral region 5C outside the intermediate region 5B.

The electrode pattern section in the Y-axis direction includes two Y-axis direction acceleration detecting electrodes DY1 and DY2 and a Y-axis direction output electrode OY connected in series to each other through connection lines LY1 to LY3. More specifically, the Y-axis direction acceleration detecting electrode DY1 and Y-axis direction acceleration detecting electrode DY2 are connected to each other through the connection lines LY1 and LY2 and the Y-axis direction acceleration detecting electrode DY1 and Y-axis direction output electrode OY are connected to each other through the connection lines LY2 and LY3. In the illustrated embodiment, the connection lines LY1 to LY3 cooperate with each other to constitute a second wiring pattern. The connection lines LY1 and LY2 each include a connection made of a silver paste.

The Y-axis direction acceleration detecting electrodes DY1 and DY2 are formed into an arcuate shape like the X-axis direction acceleration detecting electrodes DX1 and DX2 and are arranged so as to be positioned substantially on the intermediate region 5B and extend between the weight fixing region 5A and the intermediate region 5B. The Y-axis direction acceleration detecting electrodes DY1 and DY2 are positioned on a virtual Y-axis straight line YL defined so as to horizontally extend on the piezoelectric ceramic substrate 5 while being perpendicular to the virtual X-axis straight line XL defined by connecting the X-axis direction acceleration detecting electrodes DX1 and DX2 to each other and symmetrically arranged in a manner to interpose the weight fixing region 5A therebetween. Thus, the virtual Y-axis straight line YL and virtual X-axis straight line XL are defined in a manner to be perpendicular to each other, so that the acceleration detecting electrodes DX1, DY1, DX2 and DY2 are arranged at angular intervals of 90 degrees in order. The connection lines LY1 to LY3 are arranged on the outer peripheral region 5C outside the intermediate region 5B, to thereby be kept from intersecting the connection lines LX1 and the like. The connection lines LY1 and LY3 are formed into an arcuate shape and arranged contiguously to each other to form an arcuate shape in cooperation with each other and the connection line LY2 is formed into a shape like a straight line and arranged so as to extend from a connection between the connection line LY1 and the connection line LY3 to the acceleration detecting electrode DY2. The Y-axis direction output electrode OY is formed into a substantially square shape and arranged side by side with the X-axis direction output electrode OX in the outer peripheral region SC outside the intermediate region 5B.

The electrode pattern section in the Z-axis direction includes a pyroelectricity accommodating electrode AZ1, a Z-axis direction acceleration detecting electrode DZ1, a Z-axis direction acceleration detecting electrode DZ2, a pyroelectricity accommodating electrode AZ2, a pyroelectricity accommodating electrode AZ3, a Z-axis direction acceleration detecting electrode DZ3, a Z-axis direction acceleration detecting electrode DZ4, a pyroelectricity accommodating electrode AZ4 and a Z-axis direction output electrode OZ connected in series to each other in order through connection lines LZ1 to LZ8. In the illustrated embodiment, the connection lines LZ1 to LZ8 cooperate with each other to provide a third wiring pattern. The connection lines LZ2, LZ4, LZ6 and LZ8 each include a connection made of a silver paste. The connection line LZ2 for connecting the acceleration detecting electrodes DZ1 and DZ2 to each other and the connection line LZ6 for connecting the acceleration detecting electrodes DZ3 and DZ4 to each other are arranged so as to extend side by side on the weight fixing region 5A while interposing the connection line LX1 of the electrode pattern section in the X-axis direction. The connection line LZ4 for connecting the pyroelectricity accommodating electrodes AZ2 and AZ3 to each other is arranged so as to arcuately extend inside the connection line LY1 of an arcuate shape or rather in proximity to the center of the piezoelectric ceramic substrate 5. The Z-axis direction output electrode OZ is formed into a substantially square shape and arranged side by side with the X-axis direction output electrode OX and Y-axis direction output electrode OY while being positioned on the outer peripheral region 5C outside the intermediate region 5B. The X-axis direction output electrode OX, Y-axis direction output electrode OY and Z-axis direction output electrode OZ each are connected to an operation circuit (not shown), to thereby feed-an acceleration signal of a voltage signal or current signal to the operation circuit.

Four such Z-axis direction acceleration detecting electrodes DZ1 to DZ4 each are formed into a rectangular shape and arranged so as to be substantially positioned on the intermediate region 5B and partially extend between the weight fixing region 5A and the intermediate region 5B. Also, the Z-axis direction acceleration detecting electrodes DZ1 to DZ4 are arranged at a center between the acceleration detecting electrode DX2 and the acceleration detecting electrode DY1, that between the acceleration detecting electrode DY1 and the acceleration detecting electrode DX1, that between the acceleration detecting electrode DX1 and the acceleration detecting electrode DY2, and that between the acceleration detecting electrode DY2 and the acceleration detecting electrode DX2, respectively. Thus, the acceleration detecting electrodes DZ1 to DZ4 are arranged in order at angular intervals of 90 degrees. Such arrangement permits the acceleration detecting electrodes DX1, DX2, DY1, DY2 and DZ1 to DZ4 to cooperate with each other to constitute an annular electrode array extending between the weight fixing region 5A and the intermediate region 5B.

The pyroelectricity accommodating electrodes AZ1 to AZ4 respectively connected to the Z-axis direction acceleration detecting electrodes DZ1 to DZ4 are arranged on a stress generating region of the piezoelectric ceramic substrate 5 in proximity to the intermediate region 5B and formed into a substantially rectangular shape. The pyroelectricity accommodating electrodes AZ1 to AZ4 each function to neutralize an output generated from each of the Z-axis direction acceleration detecting electrodes DZ1 to DZ4 due to tensile stress or compressive stress produced in the piezoelectric ceramic substrate 5 owing to a variation in temperature. Arrangement of such pyroelectricity accommodating electrodes AZ1 to AZ4 is detailedly described in Japanese Patent Application No. 288080/1996 likewise assigned to the assignee.

The piezoelectric ceramic substrate 5 is subject at portions thereof corresponding to the X-axis direction acceleration detecting electrodes DX1 and DX2 to polarization so that when stress of the same kind occurs in the portions of the piezoelectric ceramic substrate 5 or acceleration in only the Y-axis direction or Z-axis direction occurs, spontaneous polarization charges different in polarity appear on the X-axis acceleration detecting electrode DX1 positioned on one side of the weight fixing region 5A and the X-axis direction acceleration detecting electrode DX2 positioned on the other side thereof, respectively. In the illustrated embodiment, the piezoelectric ceramic substrate 5 is polarized so that when tensile stress occurs in the portions of the piezoelectric ceramic substrate 5 positionally corresponding to the X-axis direction acceleration detecting electrodes DX1 and DX2, positive spontaneous polarization charges appear on the X-axis direction acceleration detecting electrode DX1 and negative spontaneous polarization charges appear on the X-axis direction acceleration detecting electrode DX2.

Likewise, portions of the piezoelectric ceramic substrate 5 positionally corresponding to the Y-axis direction acceleration detecting electrodes DY1 and DY2 are so polarized that when stress of the same kind occurs in the portions of the piezoelectric ceramic substrate 5 or acceleration in only the X-axis direction or Z-axis direction occurs, spontaneous polarization charges having different polarities appear on the Y-axis direction acceleration detecting electrode DY1 positioned on one side of the weight fixing region 5A and the Y-axis direction acceleration detecting electrode DX2 positioned on the other side thereof, respectively. In the illustrated embodiment, the piezoelectric ceramic substrate 5 is polarized so that when tensile stress occurs in the portions of the piezoelectric ceramic substrate 5 positionally corresponding to the Y-axis direction acceleration detecting electrodes DY1 and DY2, positive spontaneous polarization charges appear on the Y-axis direction acceleration detecting electrode DY1 and negative spontaneous polarization charges appear on the Y-axis direction acceleration detecting electrode DY2.

Also, the piezoelectric ceramic substrate 5 is subject at portions thereof corresponding to the Z-axis direction acceleration detecting electrodes DZ1 and DZ2 to polarization so that when stress of the same kind occurs in the portions of the piezoelectric ceramic substrate 5 or acceleration in only the Z-axis direction occurs, spontaneous polarization charges having the same polarity appear on the Z-axis acceleration detecting electrodes DZ1 to DZ4. In the illustrated embodiment, the piezoelectric ceramic substrate 5 is polarized so that when tensile stress occurs in the portions of the piezoelectric ceramic substrate 5 positionally corresponding to the Z-axis direction acceleration detecting electrodes DZ1 to DZ4, positive spontaneous polarization charges appear on the Z-axis direction acceleration detecting electrodes DZ1 to DZ4. The polarization may be carried out by applying a DC voltage to the piezoelectric ceramic substrate 5 after formation of the acceleration detecting electrodes of the surface electrode pattern E1 and the counter electrode pattern E0.

The piezoelectric ceramic substrate 5 which has been subject to polarization is formed on the front surface thereof with layers reduced in dielectric constant or low-dielectric layers 8 and 9 in a manner to positionally correspond to a large part of the outer peripheral region 5C except the portion thereof on which the weight fixing region 5A and pyroelectricity accommodating electrodes AZ1 to AZ4 are arranged. The low-dielectric layers 8 and 9 each may be formed of thermosetting resin (relative dielectric constant: 10) containing a glass paste substantially reduced in relative dielectric constant as compared with the piezoelectric ceramic substrate 5 by screen printing, and formed into a thickness of about 20 $\mu$m. The low-dielectric layers are preferably formed into a thickness 0.2 times as large as that of the piezoelectric ceramic substrate 5 or more using a dielectric material having a relative dielectric constant one hundredth (1/100) as small as that of the piezoelectric ceramic substrate 5 or less. Any suitable material may be used as the dielectric material so long as it is substantially reduced in relative dielectric constant as compared with the piezoelectric ceramic substrate 5. For example, glass and thermosetting resin such as epoxy or the like may be used for this purpose. The low-dielectric layer 8 is arranged so as to be positioned between the connection lines LZ2, LX1, LZ6 and the piezoelectric ceramic substrate 5 in the weight fixing region 5A and is formed into a circular shape. The low-dielectric layer 9 is arranged so as to be positioned between the connection lines LX2, LY1, LY2, LY3, LZ4, LZ8 and output electrodes OX, OY, OZ and the piezoelectric ceramic substrate 5 and is formed so as to surround the low-dielectric layer 8 outside the intermediate region 5B, with the region in which the annular electrode array (DX1, · · ·) and pyro-electricity accommodating electrodes AZ1 to AZ4 are arranged being interposed therebetween.

In the illustrated embodiment, the low-dielectric layers 8 and 9 are so formed that a sum (S1) of an area of a portion of the low-dielectric layer 8 between the connection lines LZ2, LX1, LZ6 and the piezoelectric ceramic substrate 5 and an area of a portion of the low-dielectric layer 9 arranged between the connection lines LX2, LY1, LY2, LY3, LZ4, LZ8 and output electrodes OX, OY, OZ and the piezoelectric ceramic substrate 5 is about 19.3 mm$^2$. Supposing that the piezoelectric ceramic substrate 5 has a relative dielectric constant of 2150 (dielectric constant: $3 \times 10^{-9}$ F/m) and a thickness of about 100 µm and the low-dielectric layers 8 and 9 are not provided, an electrostatic capacity formed between a pattern of the sum S1 and the counter electrode pattern E0 is about $3.67 \times 10^{-9}$ F. On the contrary, arrangement of the low-dielectric constant 8 and 9 as in the illustrated embodiment permits an electrostatic capacity C' formed between a pattern of the sum S1 and the counter electrode pattern E0 to be as small as $4.22 \times 10^{-11}$ F because the low-dielectric layers 8 and 9 superposed on the piezoelectric ceramic substrate are reduced in relative dielectric constant. Comparison between the former electrostatic capacity C and the latter one C' clearly indicates that the latter one is reduced to a level about 1/100 as high as the former one. This significantly restrains or substantially prevents a decrease in level of an acceleration signal appearing on each of the output electrodes OX, OY and OZ due to the electrostatic capacity formed between the connection lines and output electrodes and the counter electrode pattern E0.

Figure 3:
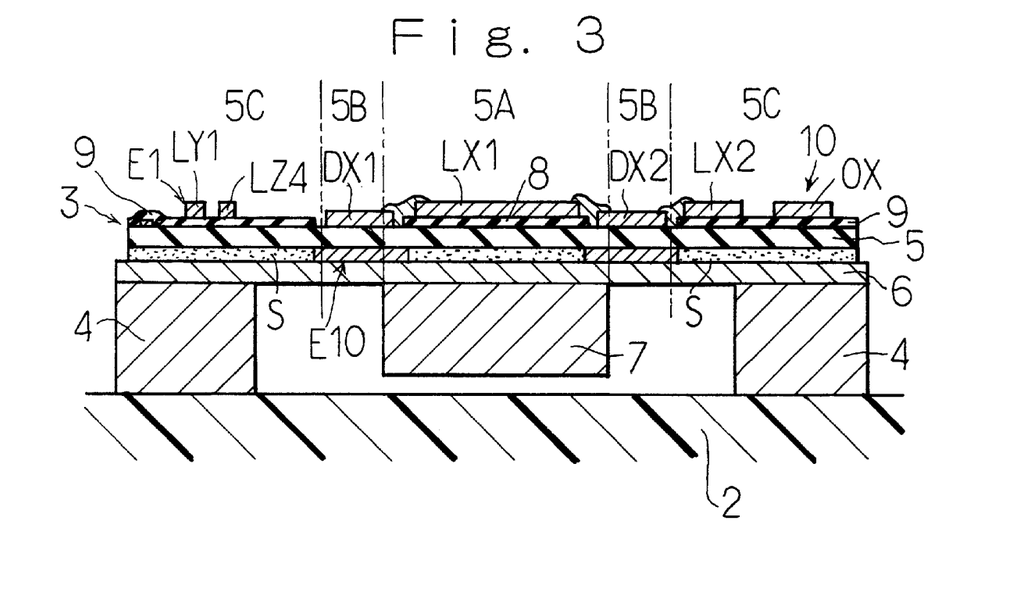
FIG. 3 is a schematic sectional view showing another embodiment of an acceleration sensor according to the present invention which is likewise embodied in the form of a triaxial acceleration sensor.

Referring now to FIG. 3, another embodiment of an acceleration sensor according to the present invention is illustrated, which is likewise embodied in the form of a triaxial acceleration sensor. A triaxial acceleration sensor of the illustrated embodiment which is generally designated at reference numeral 10 includes a piezoelectric ceramic substrate 5 which is provided on a front surface thereof with a counter electrode pattern E10. The counter electrode pattern E10 is formed into an annular shape and arranged opposite to acceleration detecting electrodes DX1, DX2, DY1, DY2 and DZ1 to DZ4 of a surface electrode pattern E1. Thus, the counter electrode pattern E10 is arranged so as not to be directly opposite to output electrodes OX1,· · and wiring patterns LX1,· ·. The piezoelectric ceramic substrate 5 is joined at a portion thereof free of the counter electrode pattern E10 to a diaphragm 6 made of metal by means of an adhesive S. Also, it is joined at a portion thereof on which the counter electrode pattern E10 is arranged to the metallic diaphragm 6 through the counter electrode pattern E10 by means of an adhesive. In the illustrated embodiment as well, the counter electrode pattern E10 is grounded to a mount base 2 through the diaphragm 6 and a support 4. Also, in the illustrated embodiment, the counter electrode pattern E10 is arranged in a manner to be obliquely opposite to the output electrode OX1, and wiring patterns LX1,· ·. In the illustrated embodiment as well, an electrostatic capacity occurring therebetween is reduced due to low-dielectric layers 8 and 9.

The remaining part of the illustrated embodiment may be constructed in substantially the same manner as the embodiments described above with reference to FIGS. 1 to 3.

In the embodiments described above, the diaphragm 6 is made of metal. However, a material for the diaphragm 6 is not limited to metal. The diaphragm 6 may be made of a non-metallic material such as glass or the like. In this instance, the counter electrode pattern E10 may be connected directly to an operation circuit (not shown). Also, the weight 7 is provided separately from the diaphragm 6. Alternatively, both may be constructed integrally with each other.

Figure 4:
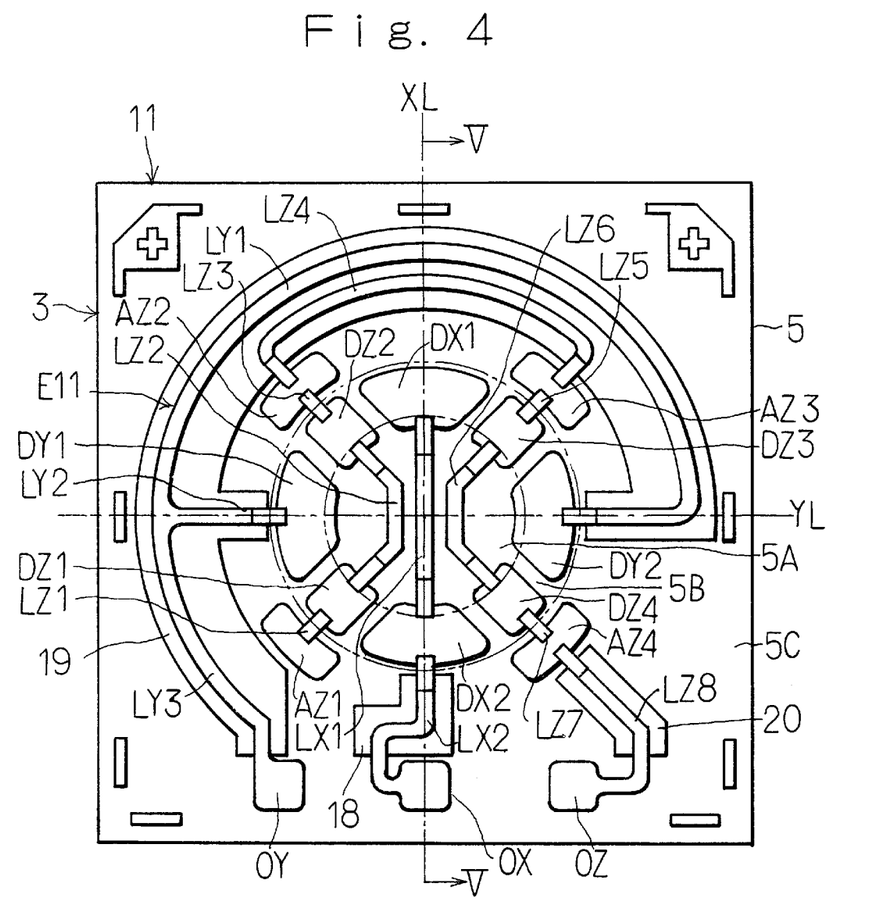
FIG. 4 is a plan view showing a further embodiment of an acceleration sensor according to the present invention which is likewise embodied in the form of a triaxial acceleration sensor.
Figure 5:
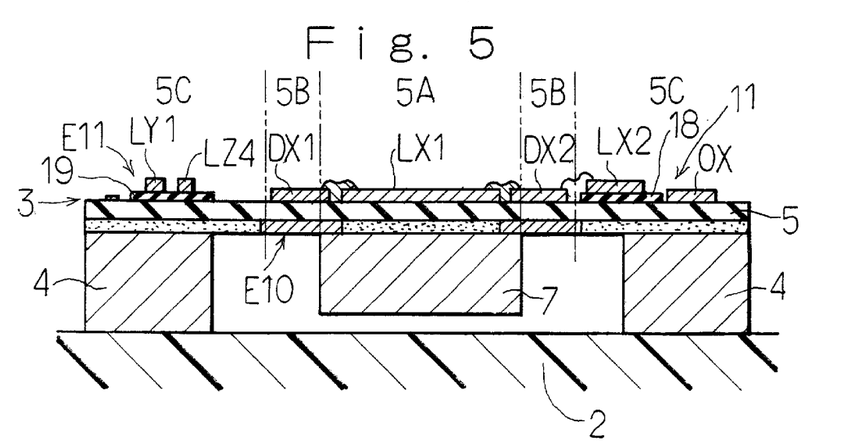
FIG. 5 is a sectional view taken along line V—V of FIG. 4.

Referring now to FIG. 4, a further embodiment of an acceleration sensor according to the present invention is illustrated, which is likewise realized in the form of a triaxial acceleration sensor. A triaxial acceleration sensor of the illustrated embodiment which is generally designated at reference numeral 11 is constructed in such a manner that a piezoelectric ceramic substrate 5 is jointed on a rear surface thereof directly to a weight 7 and a support 4 by means of an adhesive layer without any diaphragm, unlike the triaxial acceleration sensors shown in FIGS. 1 to 3. Also, in the triaxial acceleration sensor 11 of the illustrated embodiment, low-dielectric layers 18, 19 and 20 are arranged only between pattern sections of first to third wiring patterns formed on an outer peripheral region 5C and a piezoelectric ceramic substrate 5. More specifically, the low-dielectric layer 18 is arranged between a pattern section LX2 and the piezoelectric ceramic substrate 5, the low-dielectric layer 19 is arranged between pattern sections LY1 to LY3 and LZ4 and the piezoelectric ceramic substrate 5, and the low-dielectric layer 20 is arranged between a pattern section LZ8 and the piezoelectric ceramic substrate 5. In particular, when a counter electrode pattern E10 is arranged so as to be opposite to only acceleration detecting electrodes DX1, · · of an electrode pattern E11, even arrangement of the low-dielectric layer only between each of the main pattern sections and the piezoelectric ceramic substrate 5 substantially contributes to a reduction in electrostatic capacity. Also, such arrangement of the low-dielectric layers significantly reduces an area on which the low-dielectric layers are formed, leading to a decrease in manufacturing cost, as compared with the embodiment shown in FIGS. 1 and 2.

In the illustrated embodiment, as described above, the low-dielectric layers are arranged only between the main pattern sections of the wiring patterns and the piezoelectric ceramic substrate 5. However, it is a matter of course that the low-dielectric layers may be arranged between output electrodes and the piezoelectric ceramic substrate 5 as well.

The remaining part of the illustrated embodiment may be constructed in substantially the same manner as each of the embodiments shown in FIGS. 1 to 3.

The embodiments described above each are provided with the pyroelectricity accommodating electrodes AZ1 to AZ4. However, the present invention may be effectively applied to a triaxial acceleration sensor free of such pyroelectricity accommodating electrodes AZ1 to AZ4. Also, in each of the embodiments described above, one such X-axis direction output electrode and one such Y-axis direction output electrode are arranged. Alternatively, such output electrodes may be provided for the acceleration detecting electrodes DX1 and DX2, respectively. Likewise, the output electrodes may be provided for the acceleration detecting electrodes DY1 and DY2, respectively.

When the present invention is applied to a triaxial acceleration sensor, it is preferable that in order to coincide levels of acceleration signals in the respective directions with each other, a pattern of the acceleration detecting electrodes and arrangement thereof are selected so as to coincide the total amounts of spontaneous polarization charges generated on the detecting electrodes in the respective directions with each other when acceleration of the same magnitude is applied in each of the X, Y and Z directions.

Further, the present invention may be effectively applied to either a uniaxial acceleration sensor or a biaxial acceleration sensor.

Figure 6:
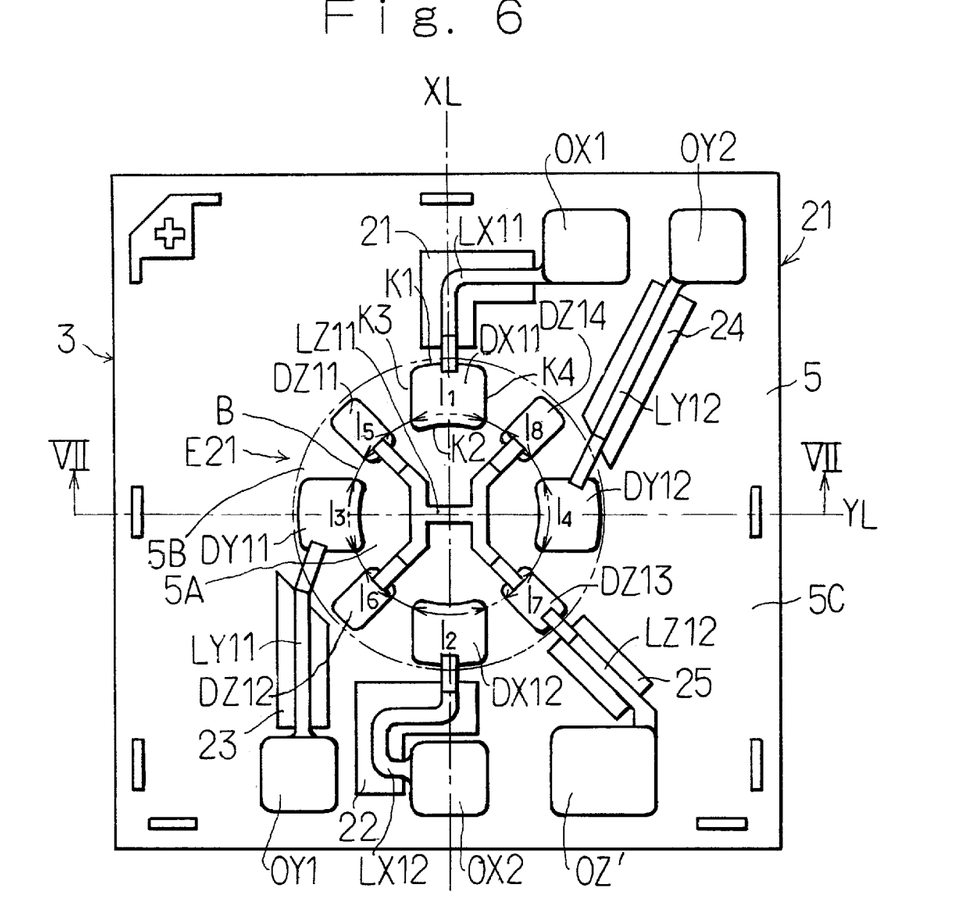
FIG. 6 is a plan view showing still another embodiment of an acceleration sensor according to the present invention which is likewise embodied in the form of a triaxial acceleration sensor.
Figure 7:
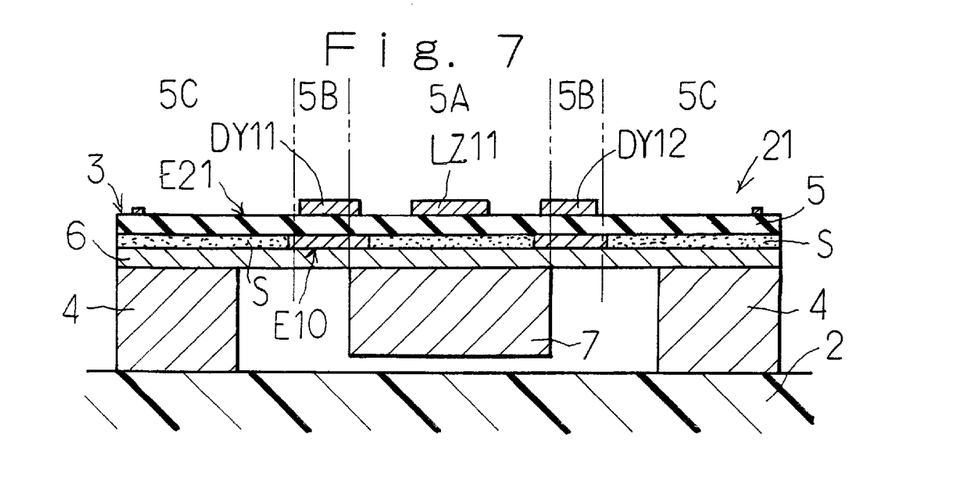
FIG. 7 is a sectional view taken along line VII—VII of FIG. 6.

Referring now to FIGS. 6 and 7, still another embodiment of an acceleration sensor according to the present invention is illustrated, which is likewise realized in the form of a triaxial acceleration sensor. A triaxial acceleration sensor of the illustrated embodiment which is generally designated at reference numeral 21 includes a surface electrode pattern E21 free of any pyroelectricity accommodating electrode, unlike the surface electrode pattern of each of the triaxial acceleration sensors shown in FIGS. 1 to 4. More particularly, the surface electrode pattern E21 of the triaxial acceleration sensor 21 of the illustrated embodiment includes an electrode pattern section in an X-axis direction, which is so constructed that two X-axis direction acceleration detecting electrodes DX11 and DX12 and two X-axis acceleration output electrodes OX1 and OX2 are connected to each other through two pattern sections LX11 and LX12, respectively. In the illustrated embodiment, two such pattern sections LX11 and LX12 cooperate together to provide a first wiring pattern.

The X-axis direction acceleration detecting electrodes DX11 and DX12 each are formed into a substantially rectangular shape. The acceleration detecting electrode DX11 includes an arcuately curved side K1 extending along an outer periphery of an annular intermediate region 5B of a piezoelectric ceramic substrate 5 or a region thereof positioned outside a weight facing region 5A thereof, a curved side K2 extending along an inner periphery of the annular intermediate region 5B and positioned in the weight facing region 5A, and two straight side K3 and K4 extending between the curved sides K1 and K2 in a manner to be substantially parallel to each other. Thus, the X-axis direction acceleration detecting electrode DX11 is so arranged that the paired sides K3 and K4 positioned in a direction in which an annular electrode array defined by acceleration detecting electrodes DZ11, DY11, DZ12, DZ13, DY12 and DZ14 as well as the X-axis direction acceleration detecting electrodes DX11 and DX12 extends are rendered substantially parallel to each other. Also, the paired sides K3 and K4 are arranged so as to extend substantially in parallel to a virtual line XL defined so as to extend through a central point of the weight facing region 5A of the piezoelectric ceramic substrate 5 and a middle point between the paired sides K3 and K4 of the X-axis direction acceleration detecting electrode DX11. Thus, the X-axis direction acceleration detecting electrodes DX11 and DX12 are arranged substantially on the intermediate region 5B while partially extending between the weight facing region 5A and the intermediate region 5B. Also, the X-axis direction acceleration detecting electrodes DX11 and DX12 are symmetrically arranged so as to interpose the weight facing region 5A therebetween while being positioned on the virtual X-axis straight line XL extending on the piezoelectric ceramic substrate 5. The paired output electrodes OX1 and OX2 each are formed into a substantially square shape.

The surface electrode pattern E21 of the triaxial acceleration sensor 21 of the illustrated embodiment also includes an electrode pattern section in a Y-axis direction, which is so constructed that Y-axis direction acceleration detecting electrodes DY11 and DY12 and two Y-axis acceleration output electrodes OY1 and OY2 are connected to each other through two pattern sections LY11 and LY12, respectively. In the illustrated embodiment, the pattern sections LY11 and LY12 cooperate with each other to constitute a second wiring pattern.

The Y-axis direction acceleration detecting electrodes DY11 and DY12 each are formed into a substantially rectangular shape like the X-axis direction acceleration detecting electrodes DX11 and DX12 described above. More specifically, the Y-axis direction acceleration detecting electrodes DY11 and DY12 are so formed that pair of sides thereof, positioned in the direction in which the annular electrode array formed by the acceleration detecting electrodes DZ11, DX11, DZ12, DZ13, DX12 and DZ14 as well as the Y-axis direction acceleration detecting electrodes DY11 and DY12 extends, are rendered substantially parallel to each other. Also, the paired sides extend substantially in parallel to a virtual line YL defined so as to extend through the central point of the weight facing region 5A of the piezoelectric ceramic substrate 5 and a middle point between the paired sides of the Y-axis direction acceleration detecting electrode DY11 and DY12. In addition, the Y-axis direction acceleration detecting electrodes DY11 and DY12 each are arranged substantially on the intermediate region 5B while partially extending between the weight facing region 5A and the intermediate region 5B. Further, the Y-axis direction acceleration detecting electrodes DY11 and DY12 are symmetrically arranged so as to interpose the weight facing region 5A therebetween while being positioned on the virtual Y-axis straight line YL extending on the piezoelectric ceramic substrate 5 in a manner to be perpendicular to the virtual X-axis straight line XL defined by connecting the paired X-axis direction lacceleration detecting electrodes DX11 and DX12. The paired output electrodes OY1 and OY2 each are formed into a substantially square shape, like the X-axis direction output electrodes OX1 and OX2.

The surface electrode pattern E21 of the triaxial acceleration sensor 21 further includes an electrode pattern section in a Z-axis direction, which is so constructed that four Z-axis direction acceleration detecting electrodes DZ11 to DZ14 are connected to each other through a first pattern section LZ11 and the Z-axis direction acceleration detecting electrode DZ13 is connected to a Z-axis acceleration output electrode OZ' through a second pattern section LZ12. In the illustrated embodiment, the first pattern section LZ11 and second pattern section LZ12 cooperate together to constitute a third wiring pattern.

The Z-axis direction acceleration detecting electrodes DZ11 to DZ14 each are formed into a substantially rectangular shape like the X-axis direction acceleration detecting electrodes DX11 and DX12. More specifically, the Z-axis direction acceleration detecting electrodes DZ11 to DZ14 are so formed that a pair of sides thereof positioned in the direction in which the annular electrode array formed by the acceleration detecting electrodes DX11, DZ11, ·· extends are rendered substantially parallel to each other. In addition, the paired sides extend substantially in parallel to a virtual line defined so as to extend through the central point of the weight facing region 5A of the piezoelectric ceramic substrate 5 and a middle point between the paired sides of each of the Z-axis direction acceleration detecting electrode DZ11 to DZ14. Also, the Z-axis acceleration detecting electrodes DZ11 to DZ14 each are arranged substantially on the intermediate region 5B while partially extending between the weight facing region 5A and the intermediate region 5B. Further, four such Z-axis direction acceleration detecting electrodes DZ11 to DZ14 are arranged at a central position between the acceleration detecting electrodes DX11 and DY11, that between the acceleration detecting electrodes DY11 and DX12, that between the acceleration detecting electrodes DX12 and DY12, that between the acceleration detecting electrodes DY12 and DX11, respectively. Thus, the X-axis direction acceleration detecting electrodes DZ11 to DZ14 are arranged so as to be spaced from each other at angular intervals of 90 degrees. Such arrangement of the X-axis direction acceleration detecting electrodes DZ11 to DZ14 permits the acceleration detecting electrodes DX11, DX12, DY11, DY12 and DZ11 to DZ14 to constitute an annular electrode array which surrounds the weight facing region 5A. The single output electrode OZ' is formed into a substantially rectangular shape. The output electrode OZ', as well as the output electrodes OX1, OX2, OY1 and OY2 are connected to an operation circuit (not shown), resulting in an acceleration signal being fed from each of the output electrodes to the operation circuit.

In the illustrated embodiment as well, low-dielectric layers 21 to 25 are arranged only between the pattern sections of the first to third wiring patterns on an outer peripheral region 5C and the piezoelectric ceramic substrate 5. More specifically, the low-dielectric layer 21 is formed between the pattern section LX11 and the piezoelectric ceramic substrate 5, the low-dielectric layer 22 is arranged between the pattern section LX12 and the piezoelectric ceramic substrate 5, the low-dielectric layer 23 is arranged between the pattern section LY11 and the piezoelectric ceramic substrate 5, the low-dielectric layer 24 is arranged between the pattern section LY12 and the piezoelectric ceramic substrate 5, and the low-dielectric layer 25 is arranged between the pattern section LZ12 and the piezoelectric ceramic substrate 5.

Further, in the illustrated embodiment, the X-, Y- and Z-axis direction acceleration detecting electrodes are so formed and arranged that a sum (11+12) of a length 11 by which a virtual boundary line B defined at a boundary between the weight facing region 5A of the piezoelectric ceramic substrate 5 and the intermediate region 5B thereof crosses the X-axis direction acceleration detecting electrode DX11 and a length 12 by which the virtual boundary line B crosses the X-axis direction acceleration detecting electrode DX12, that (13+14) of a length 13 by which the virtual boundary line B crosses the Y-axis direction acceleration detecting electrode DY11 and a length 14 by which the virtual boundary line B crosses the Y-axis direction acceleration detecting electrode DY12, and that (15+16+17+18) of a length 15 by which the virtual boundary line B crosses the Z-axis direction acceleration detecting electrode DZ11, a length 16 by which the virtual boundary line B crosses the Z-axis direction acceleration detecting electrode DZ12, a length 17 by which the virtual boundary line B crosses the Z-axis direction acceleration detecting electrode DZ13, and a length 18 by which the virtual boundary line B crosses the Z-axis direction acceleration detecting electrode DZ18 are equal to each other or 3.08 mm. Also, the acceleration detecting electrodes are so formed and arranged that a sum of areas of the paired X-axis direction acceleration detecting electrodes DX11 and DX12, that of the paired Y-axis direction acceleration detecting electrodes DY11 and DY12, and that of the four Z-axis direction acceleration detecting electrodes DZ11 to DZ14 are equal to each other or 4.4mm². Such construction of the illustrated embodiment permits a peak value of spontaneous polarization charges generated at both X-axis direction acceleration detecting electrodes DX11 and DX12, that of both Y-axis direction acceleration detecting electrodes DY11 and DY12 and that of the Z-axis direction acceleration detecting electrodes DZ11 to DZ14 to be substantially equal to each other, when X-, Y- or Z-axis direction acceleration of the same magnitude is solely applied to the weight. Also, distributions of the charges are rendered equal to each other. Thus, the amount of charges generated from the X-axis direction acceleration electrodes, that of the Y-axis direction acceleration electrodes and that of the Z-axis direction acceleration electrodes are permitted to be substantially equal to each other.

Figure 8:
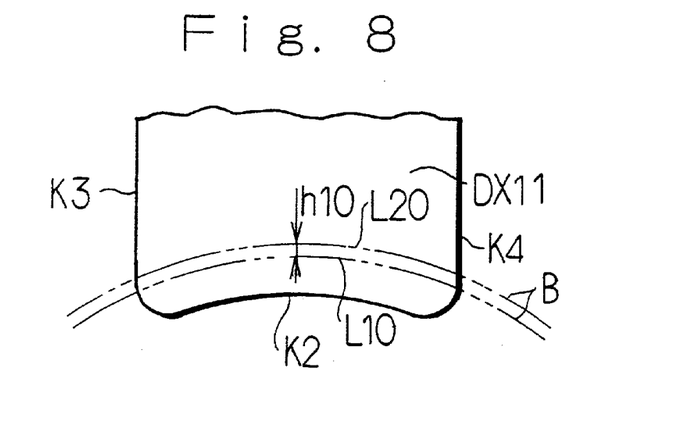
FIG. 8 is a fragmentary enlarged view showing operation of the triaxial acceleration sensor of FIG. 6.

In each of the triaxial acceleration sensors shown in FIGS. 1 to 4, the surface electrode pattern causes the paired sides of each of the acceleration detecting sensors to be defined in a manner to be radially spread. This, when the fixed position of the weight is deviated, causes a variation in length by which the virtual boundary line defined at the boundary between the weight facing region and the intermediate region crosses each of the acceleration detecting electrode, so that spontaneous polarization charges appearing on the acceleration detecting electrodes are substantially varied in peak value, leading to a deterioration in accuracy at which the acceleration is detected. Also, application of the Z-axis acceleration to the weight 7 while keeping the position of the weight deviated causes a large amount of spontaneous polarization charges to appear on one of both acceleration electrodes between which the weight facing region is interposed and a small amount of spontaneous polarization charges to appear on the other electrode, leading to a deterioration in accuracy of detection of the acceleration. On the contrary, in the illustrated embodiment, the acceleration detecting electrodes each are so constructed that the paired sides thereof positioned in the direction in which the annular electrode array formed by the acceleration detecting electrodes extends are rendered substantially parallel to each other. Such construction, even when the fixed position of the weight 7 is deviated by a length h10 in a direction from the X-axis direction acceleration electrode DX12 to the X-axis direction acceleration electrode DX11 as shown in FIG. 8, permits a length L10 or L20 of the virtual boundary line B crossing the acceleration detecting electrode DX11 to be kept substantially unvaried. This is also true of the remaining acceleration electrodes. Thus, even if the fixed position of the weight 7 is deviated within a range of an error in manufacturing of the triaxial acceleration sensor, a variation in peak value of spontaneous polarization charges appearing on each of the acceleration detecting electrodes is reduced, to thereby minimize or substantially prevent a deterioration in accuracy of detection of the acceleration. Further, even when Z-axis direction acceleration is applied to the weight 7 while keeping the fixed position of the weight thus deviated, the above-described construction of the illustrated embodiment keeps a substantial difference from occurring between the amount of spontaneous polarization charges appearing on the electrode DX11 and that on the electrode DX12, to thereby prevent erroneous detection of acceleration in the X-axis direction.

As can be seen from the foregoing, the present invention reduces an electrostatic capacity between the whole wiring pattern or a part thereof and the counter electrode pattern, to thereby minimize a reduction in output.

Also, application of the present invention to a triaxial acceleration sensor reduces a different in electrostatic capacity between the acceleration output electrode and wiring pattern and the counter electrode pattern to a substantially negligible degree. This eliminates a necessity of subjecting an acceleration signal in each of the directions to amplification to correct a level of the signal. Actually, it is not easy to fully coincide the signal levels with each other. However, the present invention permits the signal levels to be equal to or coincident with each other to a certain degree. When the triaxial acceleration sensor is required to exhibit high accuracy, a level of the acceleration in each of the directions may be adjusted by means of an amplifier as in the prior art. In this instance, acceleration levels in the respective directions are already rendered substantially coincident with each other, so that the adjustment may be facilitated.

Further, the acceleration detecting electrodes each are so formed that the paired sides thereof positioned in the direction in which the annular electrode array extends may be go rendered parallel to each other. Such formation of the electrodes prevents displacement of the weight facing region of the piezoelectric ceramic substrate due to deviation of the fixed position of the weight from causing a variation in length by which the boundary line crosses each of the acceleration detecting electrodes. Thus, even when the fixed position of the weight is deviated within a range of an error in manufacturing of the triaxial acceleration sensor, a variation in peak value of spontaneous polarization charges appearing on each of the acceleration detecting electrodes is reduced, to thereby minimize or substantially prevent a deterioration in accuracy of detection of the acceleration.

While preferred embodiments of the invention have been described with a certain degree of particularity with reference to the accompanying drawings, obvious modifications and variations are possible in light of the above teachings. It is therefore to be understood that within the scope of the appended claims, the invention may be practiced otherwise than as specifically described.

What is claimed is:

1. An acceleration sensor comprising:
    a piezoelectric ceramic substrate;
    a surface electrode pattern formed on a front surface of said piezoelectric ceramic substrate and including acceleration detecting electrodes for generating a signal depending on acceleration, output electrodes for externally outputting an output of said acceleration detecting electrodes and wiring patterns for electrically connecting said acceleration detecting electrodes and output electrodes to each other therethrough;
    a counter electrode pattern formed on a rear surface of said piezoelectric ceramic substrate and arranged opposite to at least said acceleration detecting electrodes;
    a weight arranged in a manner to be fixed with respect to said piezoelectric ceramic substrate to generate stress depending on said acceleration in a region in which said acceleration detecting electrodes are arranged; and
    low-dielectric layers arranged between all of said wiring patterns or an essential part thereof and said piezoelectric ceramic substrate;
    said low-dielectric layers being substantially reduced in relative dielectric constant and being of sufficient thickness, as compared with that of said piezoelectric ceramic substrate so that any loss in the acceleration signal outputted from each of said output electrodes due to an electrostatic capacity formed between said wiring patterns and output electrodes, and said counter electrode pattern is minimized;
    said piezoelectric ceramic substrate being polarized at a portion thereof between said acceleration detecting electrodes and said counter electrode pattern.

2. An acceleration sensor as defined in claim 1, wherein said weight is joined directly to a central portion of said rear surface of said piezoelectric ceramic substrate.

3. An acceleration sensor as defined in claim 1, wherein said piezoelectric ceramic substrate has a diaphragm joined to said rear surface thereof; and said weight is arranged on a central portion of said diaphragm.

4. An acceleration sensor as defined in claim 1, wherein said low-dielectric layers are arranged between a portion of said wiring patterns positioned outside a region thereof in which said acceleration detecting electrodes are arranged and said piezoelectric ceramic substrate.

5. An acceleration sensor as defined in claim 4, wherein said low-dielectric layers are also arranged between said output electrodes and said piezoelectric ceramic substrate.

6. An acceleration sensor as defined in claim 1, wherein said low-dielectric layers each have a relative dielectric constant set to a level one hundredth as low as that of said piezoelectric ceramic substrate or less and are formed into a thickness 0.2 times as large as that of said piezoelectric ceramic substrate or more.

7. An acceleration sensor as defined in claim 6, wherein said low-dielectric layers each are formed of a material comprising glass or thermosetting resin.

8. An acceleration sensor as defined in claim 6, wherein said low-dielectric layers each are made of a material comprising thermosetting resin, and said wiring patterns and output electrodes each are made of a conductive paste formed by incorporating a conductive powder in thermosetting resin.

9. A triaxial acceleration sensor comprising:
    a piezoelectric ceramic substrate;
    a surface electrode pattern formed on a front surface of said piezoelectric ceramic substrate and including one or more X-axis direction acceleration detecting electrodes for detecting acceleration in an X-axis direction, one or more Y-axis direction acceleration detecting electrodes for detecting acceleration in a Y-axis direction, one or more Z-axis direction acceleration detecting electrodes for detecting acceleration in a Z-axis direction, one or more X-axis direction acceleration output electrodes, one or more Y-axis direction acceleration output electrodes, one or more Z-axis direction acceleration output electrodes, a first wiring pattern for connecting said X-axis direction acceleration detecting electrodes and X-axis direction acceleration output electrodes to each other, a second wiring pattern for connecting said Y-axis direction acceleration detecting electrodes and Y-axis direction acceleration output electrodes to each other, and a third wiring pattern for connecting said Z-axis direction acceleration detecting electrodes and Z-axis direction acceleration output electrodes to each other;
    a counter electrode pattern formed on a rear surface of said piezoelectric ceramic substrate and arranged opposite to at least said X-axis direction acceleration electrodes, Y-axis direction acceleration detecting electrodes and Z-axis direction acceleration detecting electrodes;
    a weight of a cylindrical or hollow-cylindrical shape arranged in a manner to be fixed with respect to said piezoelectric ceramic substrate to generate stress depending on said acceleration in a region in which said X-axis direction acceleration detecting electrodes, Y-axis direction acceleration detecting electrodes and Z-axis direction acceleration detecting electrodes each are arranged; and
    low-dielectric layers arranged between all of at least said first to third wiring patterns or an essential part thereof and said piezoelectric ceramic substrate;
    said low-dielectric layers being substantially reduced in relative dielectric constant and being of sufficient thickness, as compared with that of said piezoelectric ceramic substrate so that any loss in the acceleration signal outputted from each of said output electrodes due to an electrostatic capacity formed between said wiring patterns, and output electrodes and said counter electrode pattern is minimized;

said piezoelectric ceramic substrate being polarized at a portion thereof between each of said X-axis direction acceleration detecting electrodes, Y-axis direction acceleration detecting electrodes and Z-axis direction acceleration detecting electrodes and said counter electrode pattern.

10. A triaxial acceleration sensor as defined in claim 9, wherein said weight is joined directly to a central portion of said rear surface of said piezoelectric ceramic substrate.

11. A triaxial acceleration sensor as defined in claim 9, wherein said piezoelectric ceramic substrate has a diaphragm joined to said rear surface thereof; and said weight is arranged on a central portion of said diaphragm.

12. A triaxial acceleration sensor as defined in claim 9, wherein said low-dielectric layers each are arranged between a portion of each of said first to third wiring patterns positioned outside said region in which each of said X-axis direction acceleration detecting electrodes, Y-axis direction acceleration detecting electrodes and Z-axis direction detecting electrodes is arranged and said piezoelectric ceramic substrate.

13. A triaxial acceleration sensor as defined in claim 12, wherein low-dielectric layers each are arranged each of said X-axis direction acceleration output electrodes, Y-axis direction acceleration output electrodes and Z-axis direction acceleration output electrodes and said piezoelectric ceramic substrate.

14. A triaxial acceleration sensor as defined in claim 9, wherein said low-dielectric layers each have a relative dielectric constant set to a level one hundredth as low as that of said piezoelectric ceramic substrate or less and is formed into a thickness 0.2 times as large as that of said piezoelectric ceramic substrate or more.

15. A triaxial acceleration sensor as defined in claim 9, wherein said low-dielectric layers each are formed of a material comprising glass or thermosetting resin.

16. A triaxial acceleration sensor as defined in claim 9, wherein said low-dielectric layers each are made of a material comprising thermosetting resin and; said first wiring pattern said second wiring pattern, said third wiring pattern said X-axis acceleration output electrode, said Y-axis acceleration output electrode and said Z-axis acceleration output electrode each are made of a conductive paste formed by incorporating a conductive powder in thermosetting resin.

17. A triaxial acceleration sensor as defined in claim 9, wherein said X-axis direction acceleration detecting electrodes, Y-axis direction acceleration detecting electrodes and Z-axis direction acceleration detecting electrodes are arranged so as to form an annular electrode array extending between a circular weight facing region of said piezoelectric ceramic substrate opposite to said weight and region thereof positioned outside said weight facing region and surrounding said weight facing region while being spaced at intervals from each other; and the aforementioned array formed by the X-axis direction acceleration detecting electrodes, Y-axis direction acceleration detecting electrodes and Z-axis direction acceleration detecting electrodes each are so formed that a pair of sides thereof defined in a direction in which said electrode array extends substantially parallel to each other.

18. A triaxial acceleration sensor as defined in claim 17, wherein paired sides of said X-axis direction acceleration detecting electrodes are defined so as to be substantially parallel to a virtual line defined by connecting a central point of said weight facing region of said piezoelectric ceramic substrate and an intermediate point defined between paired sides of said X-axis direction acceleration detecting electrodes to each other;

paired sides of said Y-axis direction acceleration detecting electrodes are defined so as to be substantially parallel to a virtual line defined by connecting a central point of said weight facing region of said piezoelectric ceramic substrate and an intermediate point defined between paired sides of said Y-axis direction acceleration detecting electrodes to each other; and paired sides of said Z-axis direction acceleration detecting electrodes are defined so as to be substantially parallel to a virtual line defined by connecting a central point of said weight facing region of said piezoelectric ceramic substrate and an intermediate point defined between paired sides of said Z-axis direction acceleration detecting electrodes to each other.

19. A triaxial acceleration sensor as defined in claim 17, wherein a sum of lengths by which a virtual boundary line defined at a boundary between said weight facing region of said piezoelectric ceramic substrate and a region thereof positioned outside said weight facing region crosses said X-axis direction acceleration detecting electrodes, that by which said virtual boundary line crosses said Y-axis direction acceleration detecting electrodes, and that by which said virtual boundary line crosses said Z-axis direction acceleration detecting electrodes are substantially equal to each other; and a sum of areas of said X-axis direction acceleration detecting electrodes, that of said Y-axis direction acceleration detecting electrodes and that of said Z-axis direction acceleration detecting electrodes are equal to each other.

20. A triaxial acceleration sensor as defined in claim 9, wherein said counter electrode pattern is formed into an annular shape so as to be opposite to said X-axis direction acceleration-detecting electrodes, Y-axis direction acceleration detecting electrodes and Z-axis direction acceleration detecting electrodes.

* * * * *